United States Patent
Lin et al.

(10) Patent No.: US 6,243,457 B1
(45) Date of Patent: Jun. 5, 2001

(54) APPARATUS AND METHOD FOR DEPLOYING AND UPDATING SERVICES IN A TELEPHONE NETWORK

(75) Inventors: Jiunn-Liang Lin, Pan Chiao; Meng-Chia Tsay; Chun-Shiow Chen, both of Hsinchu; Chi-Tien Yeh, San Chung; Ching-Tien Huang, Hou-Py; Ming-Chih Tsai, Taipei; Su-Shen Hung, Hsinchu; Hao-Ming Chang, Taichung, all of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/127,661

(22) Filed: Jul. 31, 1998

(51) Int. Cl.[7] ....................................... H04M 7/00
(52) U.S. Cl. ...................... 379/230; 379/201; 379/207; 379/220; 370/60; 709/100
(58) Field of Search ................... 379/220, 230, 379/207, 201; 709/100; 370/60

(56) References Cited

U.S. PATENT DOCUMENTS

| | | | |
|---|---|---|---|
| 5,425,090 | * | 6/1995 | Orriss ................................. 379/201 |
| 5,438,568 | * | 8/1995 | Weisser, Jr. ........................... 370/60 |
| 5,991,389 | * | 11/1999 | Ram et al. ........................... 379/230 |
| 6,058,412 | * | 5/2000 | Kojima et al. ....................... 709/100 |
| 6,078,658 | * | 6/2000 | Yunoki ................................ 379/220 |
| 6,101,250 | * | 8/2000 | Tianen ................................ 379/207 |

* cited by examiner

Primary Examiner—Ahmad Matar
Assistant Examiner—Thjuan P. Knowlin
(74) Attorney, Agent, or Firm—Proskauer Rose, LLP

(57) ABSTRACT

The basic philosophy of Intelligent Network (IN) is the separation of service control from the telephone switches which now perform only connection control and a minimum amount of work to facilitate service control. In IN terms, Service Control Point (SCP) determined how a particular call from a user is routed and how to manipulated it once a call is set up and some interesting events happen. The telephone switch with the added IN capabilities o collaborate with the SCP in IN services is called Service Switching Point (SSP). All the services will be managed by Service Management System (SMS). For the management of IN, the Telecommunication Management Network (TMN) is adopted, all the management information are defined as managed objects and transmitted within the management network. An Q Adaptor is a software process and responsible for the maintenance of the MIB tree and the management information conversion between SMS and SCP. With Q Adaptor, the management resources of SVP are not burdened with the translating process. Separate MIB trees, service application process MIB tree and SCP platform MIB tree, and QAs well solve the problems of deploying and updating services existed in IN.

15 Claims, 7 Drawing Sheets

APPARATUS AND METHOD FOR DEPLOYING AND UPDATING SERVICES IN A TELEPHONE NETWORK

FIELD OF THE INVENTION

This invention generally relates to an Intelligent Network (IN) that is a telecommunications network services control architecture to provide a framework for a network operator to introduce, control, and manage services more effectively, economically and rapidly than a traditional telephone network architecture allows. More specifically, this invention relates to an IN wherein service application processes may be deployed and/or updated without restricting user access to the IN during the deploying and updating events.

BACKGROUND OF THE INVENTION

Using the IN increases the quantity of available resources, such as services and processing components, and aids in the rapid deployment of new resources. Within the IN, the function of service control in conventional switches is singled out and implemented with computer technology to provide faster and more efficient communication services. FIG. 1 shows an IN 100 including a service control point (SCP) 106, a service creation environment (SCE) 102, and a service management system (SMS) 104. In addition, the IN 100 includes a signal network 108, such as a CCITT No. 7 signal network, connected to the SCP 106 and signal switching points (SSPS) 109, 110. The SSPs 109, 110 are connected respectively to telephones 109A, 109B, 109C and 110A, 110B, 110C.

The SCE 102 provides a graphic interface for a user to develop service logic. The SCE 102 is used to create the building blocks of the IN 100 such as call routing, call prioritization, and service application process availability (discussed in more detail below). By utilizing the SCE 102, a programmer can describe the logical processes that define the operation and interaction of the IN 100.

The SMS 104 is managed by the network operator. The SMS 104 updates the SCP 106 with new data and/or programs and collects statistics from the SCP 106. The SMS 104 also may enable a service subscriber to control their own service parameters via a terminal (not shown) linked to the SMS 104. For example, the subscriber may define the day and time when an "800" number should be routed to a specific office. This modification may be filtered and/or validated by the network operator.

One operation of the SCP 106 is to introduce and activate new IN service application processes into the network. For a service application process based on functional components (FCs), the FCs are executed with the help of a Service Logic Interpreter (using an explanatory script). The service application process programs and the data are updated from the SMS 104. The SCP 106 may be implemented on a computer system including a processor and a memory. Some SCP service application processes may require large amounts of data which must reside on direct access storage devices, such as disks. The storage devices may be a part of the computer system or may be remotely located. Importantly, the SCP 106 should be configured to access databases efficiently and reliably. In addition, the SCP 106 should be configured to provide a software platform for rapid service application process creation, for example, through user programmability and portability.

To achieve various subscriber service application process customizations, the SCE 102 may be utilized to create a user-friendly interface for customers. For example, a new service application process may be designed and created with the SCE 102. Thereafter, the output service application process data profile may be deployed to the SCP 106 through the SMS 104. After the deployment of the new service application process, users can subscribe to the new service application process and access the new service application process from the telephone (e.g., telephone 109A). When a user makes a telephone call which requires an IN service application process, the SSP (e.g., SSP 109) recognizes it and initiates a trigger pre-installed for the IN service application process. After the triggering, the SSP establishes a connection with the SCP 106, via the signal network, and requests service. The SCP 106 will, based on the information of the call and the SCP's own database, provide instructions to the SSP as to how to treat the call. The SSP monitors call progress, connections, and other events utilizing, for example, a state machine. The SCP 106 can access this information utilizing a message passed from the SSP. Therefore, the SCP 106 possess the supervisory power of call control. In client-server terms, the SSP is the client and the SCP 106 is the server.

To manage the IN, a Telecommunications Management Network (TMN) structure is adopted which is a management network with standard protocols, interfaces, and architectures established by the International Telecommunications Union-Telecommunications (ITU-T, formerly CCITT). The TMN provides a host of management functions and communications for operation, administration, and maintenance (OAM) of the telecommunications network and its services for a multivendor environment.

In modeling for network management, logical and physical resources of interest, such as management operations, are defined as managed objects and structured within an Object-Oriented (OO) information model. AN ITU-T Recommendation M.3000 series provides a generic network information model. The M.3000 series defines TMN architecture and object classes that are common to managed telecommunications networks, are of a generic type that can be used to manage a network at a technology-independent level, or are super-classes of technology-specific managed objects in a telecommunications network. Based on the object class structure defined in an ITU-T Recommendation M.3000 series, the managed objects of the SCP, including service application processes, are modeled having a tree structure, wherein the service application processes are branches of the original tree. This, in accordance with a Bellcore GR-1286 specification wherein the structure is described as a management information base (MIB) tree.

FIG. 2 illustrates an MIB tree 200 for managing general network elements (e.g., managed objects or MOs) as defined in the ITU-T Recommendation M.3000 series. As shown, the MIB tree 200, illustratively for a network management element 210, may contain MOs, such as managed element objects 240 and network connection objects 220. In addition, the MIB tree 200 may contain fabric objects, such as termination point 250, and software objects, such as software object 230. Each of the elements within the MIB tree 200 may have a further MIB tree structure. The MIB tree structure defines a containment tree relationship between each object (e.g., the network and the network management element).

The SCP platform objects (e.g., the organizational objects of the SCP) and the service application process objects are contained within the same MIB tree. Consequently, for a modification (e.g., a service application process update) to the architecture, the entire MIB tree must be recompiled so that the SCP can operate utilizing the new architecture. This is a major problem since between the time of the modification and the time that the new MIB tree is compiled, the SCP is taken off-line. This represents an interruption in the operation of SCP which may result in a loss of service.

FIG. 3 illustrates an MIB tree 300 as defined by the Bellcore GR-1286 specification for managing and servicing relevant logic and data within an IN. Under the MIB tree architecture, an SCP management object 310 is shown having a process tree, which among other objects, contains SCP platform objects, such as an active controls object 320, and a service application process management object 330.

FIG. 4 shows a more detailed view of the service application process 330. As shown, the service application process 330 has a sub-group of managed objects including a service object 410, a subscription object 450, etc. Each sub-group may have further subgroups of managed objects. For example, the service object 410 has subgroups including service feature 420, current service subscription data 430, and service subscription data 440.

As stated above, the problem with this containment architecture is that there is no way to modify object or add a new defined object, such as the service application process management object 330, without interrupting the operation of the SCP. Interruption in the operation of the SCP may result in an interruption in the operation of the IN service.

Another problem with the previous MIB tree structure for the SCP is that the SCP is required to convert messages from a management protocol that is used by the SMS, such as Common Management Information Protocol/Common Management Information Services (CMIP/CMIS), to an SCP internal processing format. In acknowledging a command from the SMS, or communicating a response back to the SMS, the SCP has to convert the response to the communication protocol that is used by SMS. Typically, the SMS and the SCP utilize different communication protocols. Accordingly, the SCP contains a process that converts between the SMS and SCP communication protocols. This process performing constant conversions between communication protocols utilizes a great deal of the SCP resources.

Therefore, it is an object of the present invention to provide a novel architecture that is compatible with the TMN standard, yet enables new services to be deployed without interrupting other services or the operation of the SCP.

Another object of the present invention is to provide a novel architecture that is complaint with the TMN standard, yet enables a service to be updated without significantly interrupting the service and without interrupting the other services.

A further object of the present invention is to provide a novel architecture wherein the burden of the SCP communicating with the SMS is greatly reduced.

SUMMARY OF THE INVENTION

These and other objects of the present invention are achieved by an architecture for an in accordance with the present invention. In the present invention, a new architecture is disclosed that is TMN compliant and wherein service application process management is separate from management of the SCP platform. In a preferred embodiment, only SCP management objects exist under the SCP MIB tree.

In accordance with a preferred embodiment, service application process management objects are added to the SCP MIB tree and treated as SCP platform management objects. Each service application process management object instance is associated with a specific Q-Adaptor (QA) for that services application process. A QA is a software process and is responsible for the management information conversion between the SMS and the SCP. With the present inventive QA, the management resources of the SCP are not burdened with the translating process. The SCP has a QA ($QA_{SCP}$) that among other functions, translates between the SMS and the SCP.

In addition, each service application process management object is associated with a service application process MIB tree that is separated from the SCP MIB tree. In this way, the SCP platform management is separated from the service application process management. One containment tree comprises the SCP platform management function (e.g., the SCP MIB tree) while a separate containment tree is adopted for each service (e.g., the service application process MIB tree). By separating the containment trees for the SCP platform management and the service application processes, implementing a change to a service application process need not result in recompilation of the SCP MIB tree. Consequently, the SCP may continue to function even in the face of service application process additions and updates.

In accordance with the present invention, the $QA_{SCP}$ processes the SCP MIB tree for management of the SCP platform. The service application process MIB tree is removed from the SCP MIB tree and a service application process management object instance added to the SCP MIB tree. Each service application process management object instance is associated with a specific service application process MIB tree. For example, a Virtual Private Network (VPN) object instance is associated with an application process MIB tree for management of the VPN service and an Advance Free Phone (AFP) object instance is associated with an application process MIB tree for management of the AFP service.

In addition, each service application process MIB tree is maintained by a specific QA. For example, the VPN service application process MIB tree, is maintained by a $QA_{vpn}$ and the AFP service application process MIB tree is maintained by a $QA_{afp}$. Since all the service application process object instances are provided by the SCP and running on the SCP, the QAs have the same responsibilities to transfer communicating messages between the SMS and the SCP.

In a case where a service application process is updated or a new service application process is deployed, the $QA_{SCP}$ will create a new service management object instance under the SCP MIB tree, as requested by the SMS. In the new service application process management object instance, all the related management information, e.g., service class, service name and control actions, is stored. After creation of the new service application process management object instance, the SMS controls the updating/deploying process by issuing a sequence of requests to the new service application process management object instance to invoke a sequence of actions to be executed by the $QA_{SCP}$. The actions include the creation of a new QA service ($QA_{service}$) for the new service application process.

During a deploying/updating procedure, all the new information including service logic, service process, service application MIB tree, etc., is prepared separate from the original system and only a new service application process management object instance is created under the SCP MIB tree. Therefore, the original system and the running services are not interrupted. In a case where the new service application process is a service update, the original service application process management object instance, the original service application process MIB tree, and the original $QA_{service}$ are stopped at the end of the service update procedure. In this way, installing a new service or updating a running service may be performed without interrupting operation of the SCP.

BRIEF DESCRIPTION OF THE DRAWINGS

Following is a description of a preferred embodiment of the present invention that when taken in conjunction with the following drawings will demonstrate the above noted features and advantages as well as further ones. It should be expressly understood that the drawings are included for illustrative purposes and do not represent the scope of the present invention. In the drawings, like reference numerals are used to designate like parts. In the drawings:

FIG. 1 is a block diagram of a conventional IN;

DETAILED DESCRIPTION OF THE PREFERRED EMBODIMENT

For clarity of presentation, the detailed description is set out in the following subsections:

I. Overview of the Invention The invention is briefly described.

II. Service Application Process Addition Within a TMN The operation of the present invention architecture is discussed particularly with regard to adding a new service application process to an existing TMN. An illustrative process chart is also discussed.

III. Service Application Process Update Within a TMN The operation of the present invention architecture is discussed particularly with regard to updating an existing service application process within an existing TMN. An illustrative process chart is also discussed.

VI. Conclusion

I. Overview of the Invention

Figure 1:
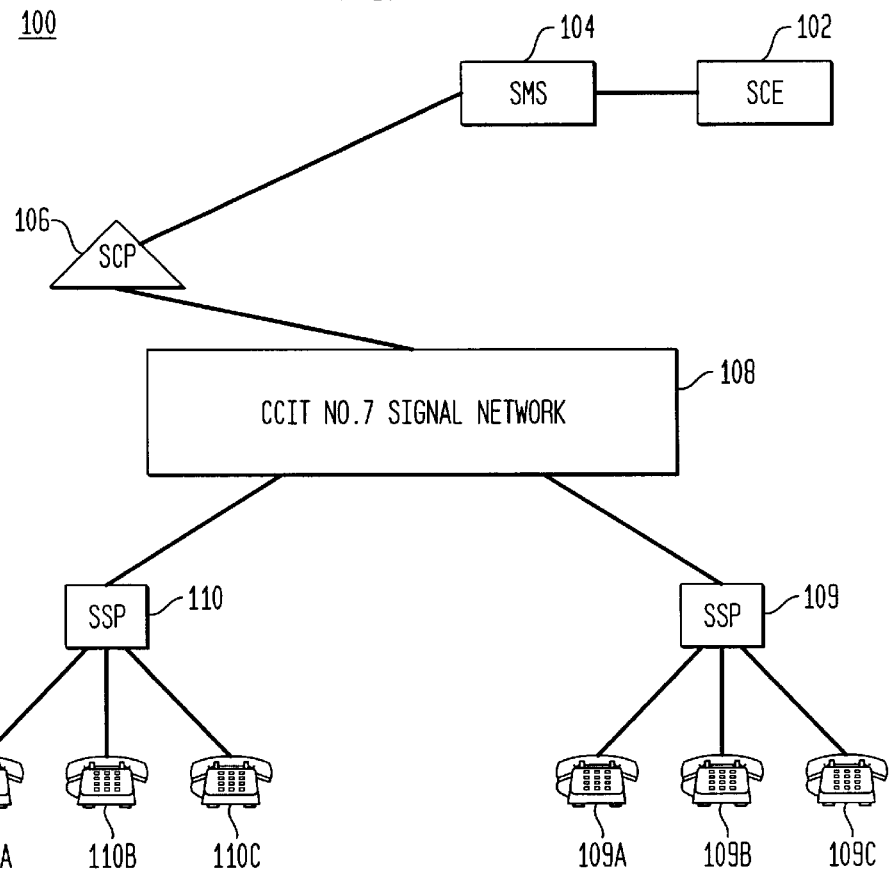
Figure 2:
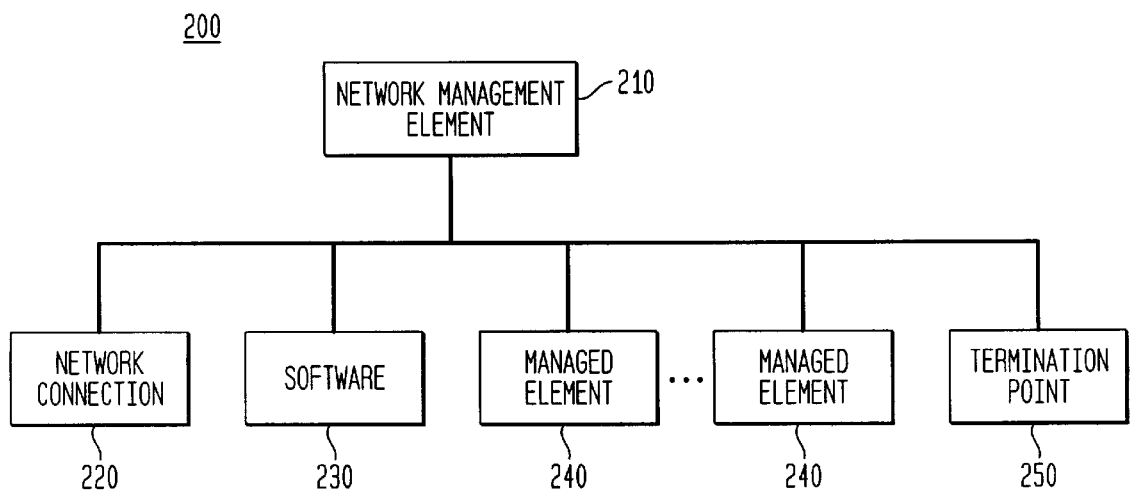
FIG. 2 is an MIB tree as defined in the ITU-T recommendation M.3000 series.
Figure 3:
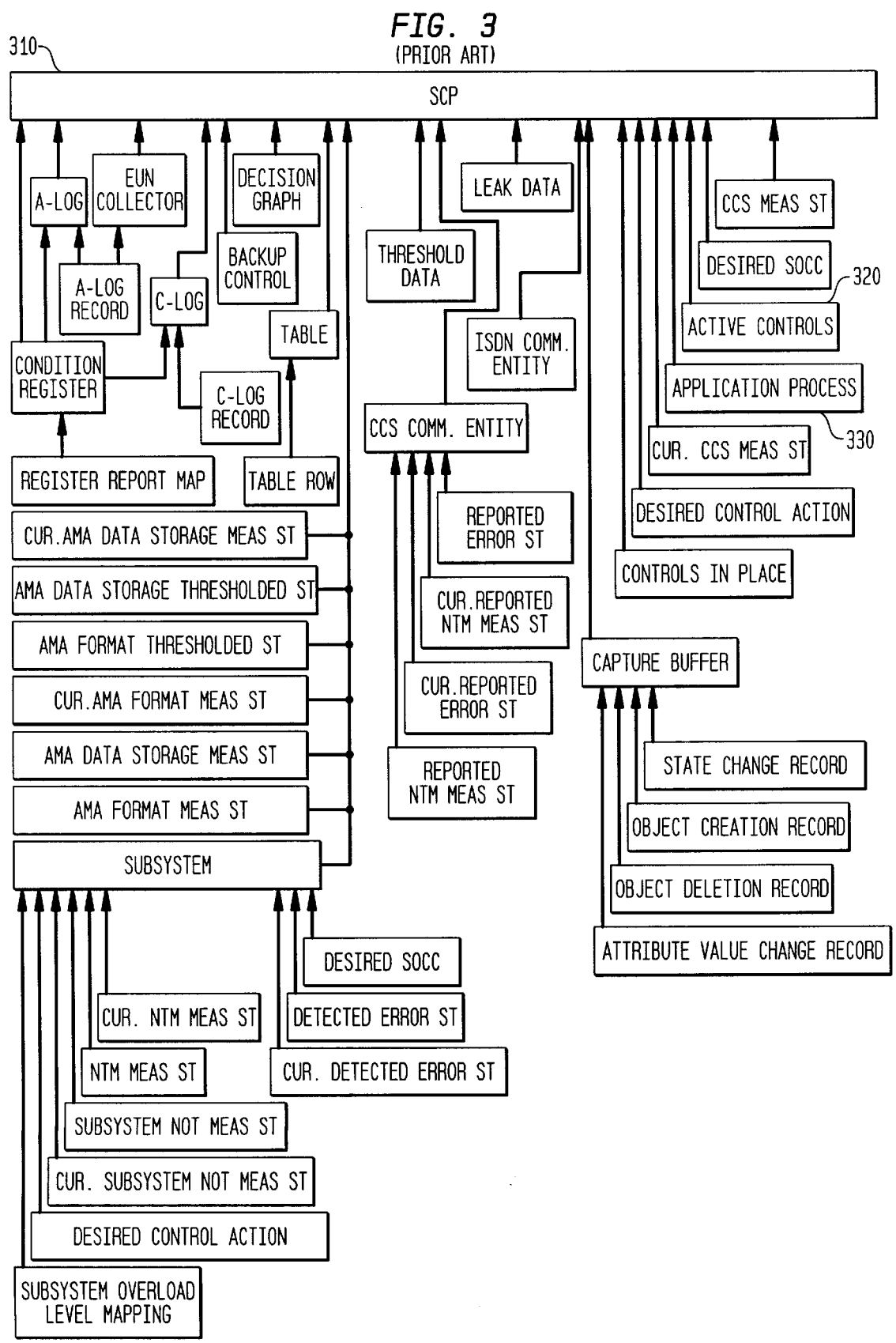
FIG. 3 is an SCP MIB tree as defined in the Bellcore GR-1286 standard, including SCP platform management objects and service application process management objects.
Figure 4:
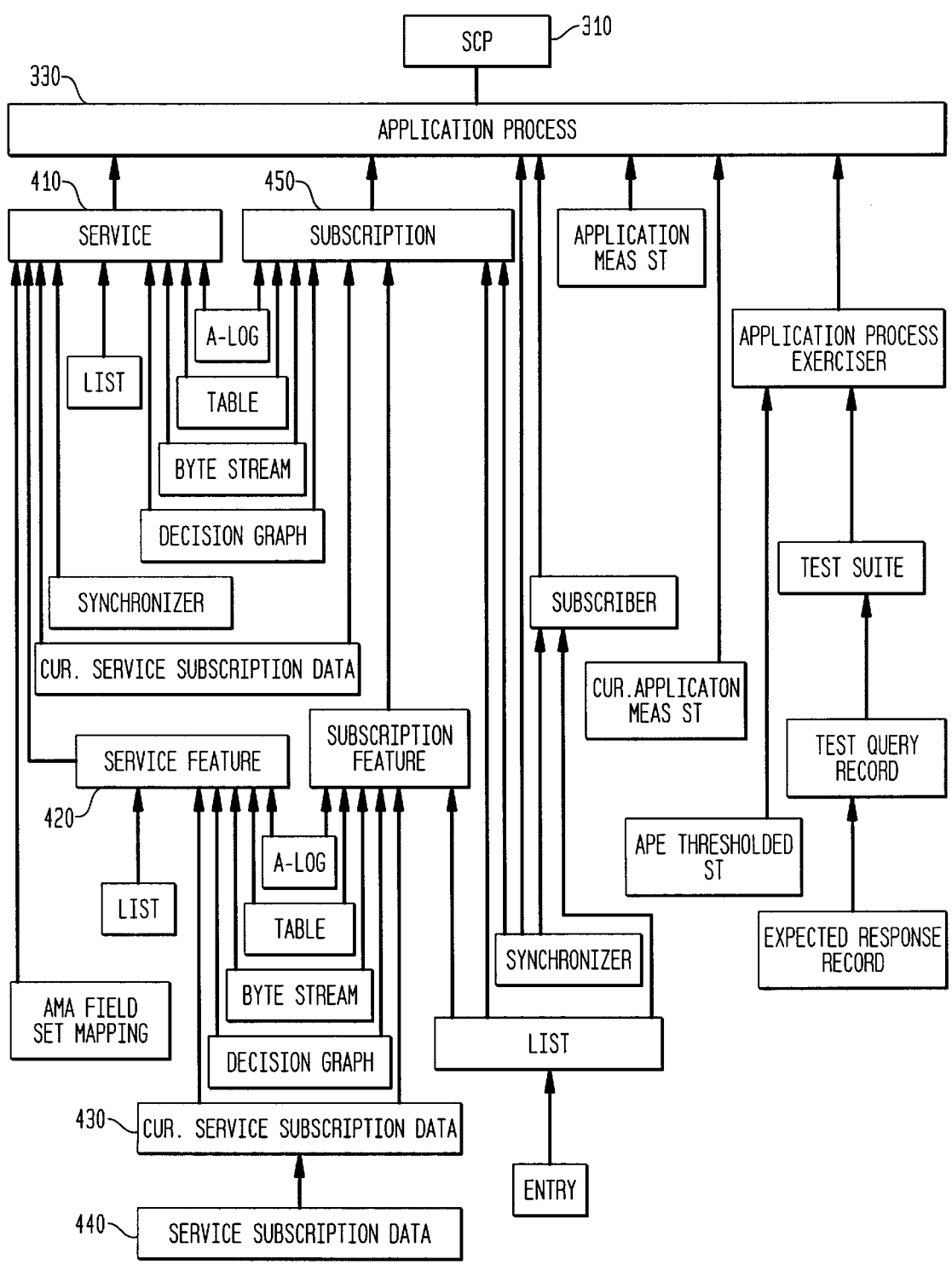
FIG. 4 is a service application process MIB tree as defined in the Bellcore GR-1286 standard.
Figure 5:
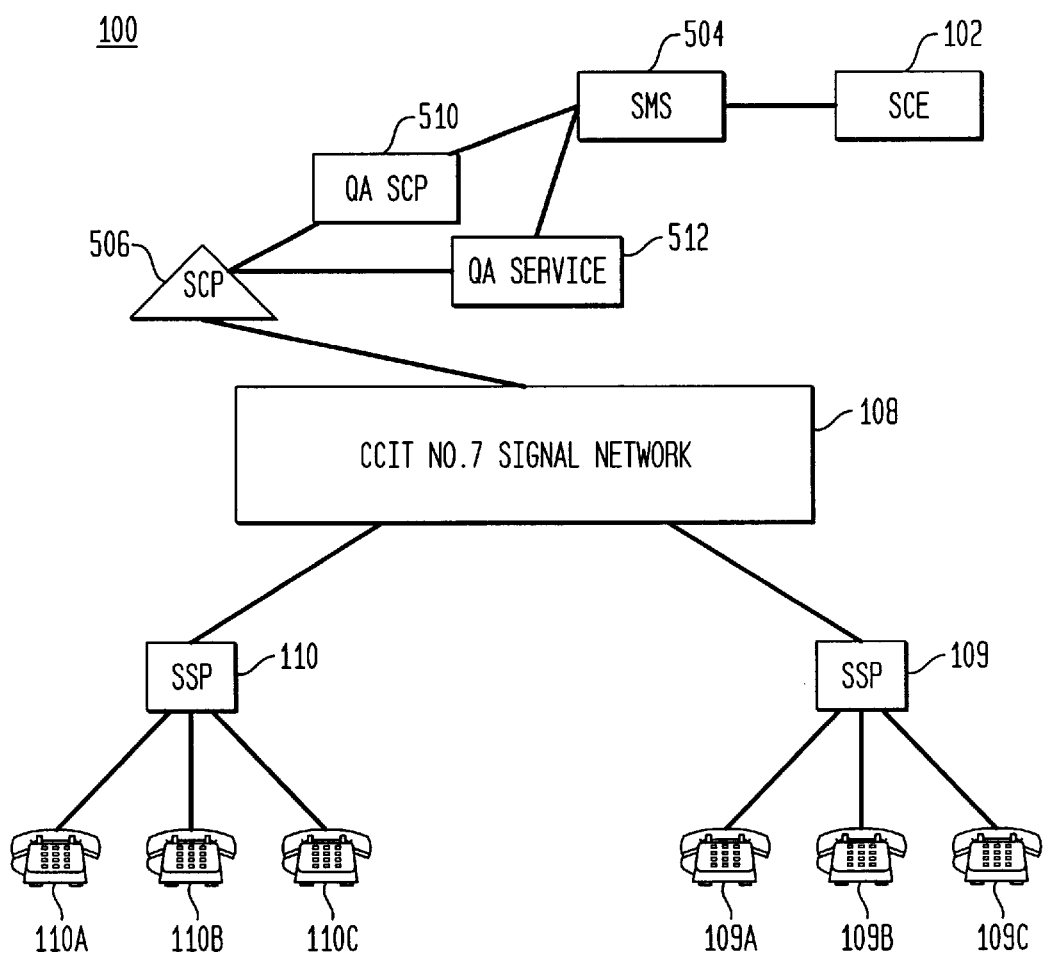
FIG. 5 is a block diagram of an IN in accordance with an embodiment of the present invention.

FIG. 5 is a block diagram of an IN 500 in accordance with an embodiment of the present invention. The present inventive IN 500 includes a novel SCP Q Adaptor ($QA_{scp}$) 150 and a Service Q Adaptor ($QA_{service}$). In addition, the In 500 includes an SCP 506, an SMS 504, a signal network 508, such as a CCITT No. 7 signal network, service switch points (SSPs) 109, 110, and respective telephones 109A, 109B, 109C and 110A, 110B, 110C. The $QA_{SCP}$ 510 and the $QA_{service}$ 512 are separated from the SCP 509 and in a preferred embodiment run on a different machine than with the SCP 509 so as not to utilize the resources of the SCP 509. The $QA_{scp}$ 540 and the $QA_{service}$ 512 share the process of information management and utilize the SCP 509 to provide IN services to subscribers.

Figure 6:
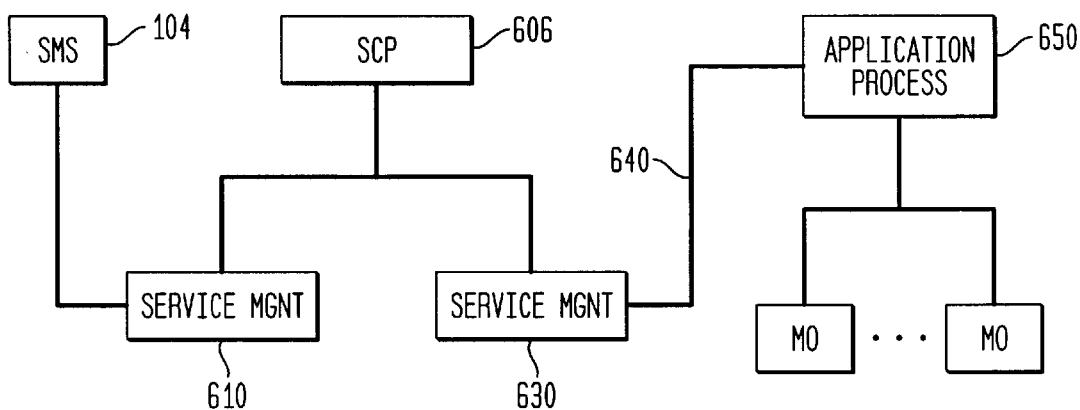
FIG. 6 is an SCP MIB tree and service application process MIB tree in accordance with an embodiment of the present invention.

FIG. 6 illustrates an embodiment of the present novel architecture for an SCP 606 and an application process 650, such as a service application process. As shown, the SCP 606 has an MIB tree 600 that contains service application process management (serviceMgnt) objects 610, 630. Inventively, the serviceMgnt object 610 has control attributes that interact with the special behavior executed by the $QA_{SCP}$. The $QA_{SCP}$ processes all the SCP platform management objects and functions as an agent for the SMS 104.

Figure 7:
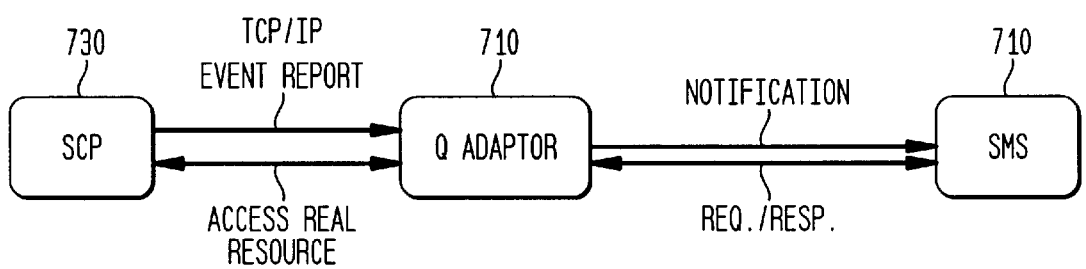
FIG. 7 is a flow diagram showing the behavior of a QA as an agent for the SMS.

FIG. 7 is a flow diagram illustrating the behavior of a Q adaptor (QA) 710 operating as an agent of an SMS 720. As shown, the QA 710 may receive requests from the SMS 720. In response to requests from the SMS 720, the QA 710 may access corresponding real resources of an SCP 730, such as management counters, service features, application management stores, etc. After performing a requested task, the QA 710 may produce a response notifying the SMS 720 of the result.

Illustratively, the SMS 720 may request creation of a VPN service. In that case, the $QA_{SCP}$ (e.g., QA 710) may then receive data and execution files from the SMS 720. The data and execution files represent the composition of the VPN. After creation of the VPN is successfully completed (or not, such as in a case where requested resources are busy), the $QA_{SCP}$ produces an appropriate corresponding response (e.g., STARTUPOK) and forwards the response to the SMS 720.

Independent of a request from the SMS 720, the SCP 730 may produce event reports that are forwarded to the SMS 720 after conversion by the QA 710 to a notification in a form utilized by the SMS 720. For example, for changing of the SCP system operation state, the SCP 730 will issue an event to notify the SMS 720 through the $QA_{SCP}$. After the conversion by the $QA_{SCP}$, the event will be forwarded to the SMS 720 in a format suitable for the SMS 720.

In some embodiments, the SMS 720 may use different communication protocols than the SCP 730. In those embodiments, the QA 710 reduces the management overhead (e.g., processing load) on the SCP 730 by converting between the different communication protocols prior to forwarding a message or command. Illustratively, the interfaces between the QA 710 and the SMS 720 may be a Q3 interface as defined by the ITU-T M.3000 series specification. However, the SCP 730 may use another protocol, such as a proprietary protocol over a transmission control protocol/internet protocol (TCP/IP) connection.

Returning to FIG. 6, in the present inventive architecture, each service application process is associated to a service application process management (serviceMgnt) object instance within the SCP MIB tree. The serviceMgnt 630 instance indicates a specific service application process, such as a VPN service. In addition, there exists an independent service application process MIB tree, such as service application process MIB tree 640, to model the management of the service application process. The independent service application process MIB tree is maintained by an independent QA. Inventively, the serviceMgnt 630 stores all the related management information of the service application process, e.g., service class, service name, and control actions, and is treated as one of the SCP platform management objects.

Illustratively, the serviceMgnt 630 invokes some actions from the QA and the SCP as requested from the SMS and returns the results of the requested actions to the SMS as executed by the QA and the SCP. The management information in a service application process management object is described below.

The service application management object class (serviceMgnt) is service dependent. There is a serviceMgnt object instance for each service application process deployed in the SCP. The serviceMgnt object illustratively contains the following attributes: serviceMgntID, serviceClass, dataFileLocation, exeFileLocation, controlState, exeState, failReason, new ServiceName.

The attribute serviceMgntID specifies the service application process name (e.g.,name+version). The serviceMgntID may be the same as an attribute serviceId for the service object class.

The attribute serviceclass specifies the service class name. For example, it may be set to vpnService for a VPN service application process.

The attribute dataFileLocation specifies the data files path for the service application process. It may include a source file path and a destination file path.

The attribute exeFileLocation specifies the execution files path. It may include a source file path and a destination file path. A change of the exeFileLocation value may cause a state change notification.

The attribute controlState is set by the SMS to invoke a specific action. The value illustratively may be DOWNLOAD, STATICDEPLOY, STARTUP, STOP, REMOVE, HANDOVER, and CUSTOMIZE.

The attribute exeState represents the result of the last service control operation in the SCP MIB tree. Any change of the value may cause a state change notification. The exeState value illustratively may be PROCEDING, DOWNLOADOK, STATICDEPLOYOK, STARTUPOK, UPDATEOK, STOPOK, REMOVEOK, HANDOVEROK, CUSTOMIZEOK, DOWNLOADFAIL, STATICDEPLOYFAIL, STARTUPFAIL, UPDATEFAIL, STOPFAIL, REMOVEFAIL, HANDOVERFAIL, and CUSTOMIZEFAIL. When the exeState value is PROCEDING, the action requested by controlState is proceeding in the SCP. At this time, the result has not yet been produced. When the requested action is finished, the exeState value will be reset according to the result.

The attribute failReason is used to store the reason why the action failed. It is valid only when the value of exeState is XXXXFAIL, such as UPDATEFAIL.

The attribute newServiceName specifies a new service application process name and is utilized while updating a service application process.

As discussed above, in the present inventive architecture, each service application process has an MIB tree, such as a VPN MIB tree. As shown in FIG. 6, the service application process MIB tree 640 is separate from the SCP MIB tree 600 which contains the SCP platform management objects. In a preferred embodiment, the SCP MIB tree only contains SCP platform management objects. Inventively, the $QA_{SCP}$ processes and manages all the SCP platform management objects in the SCP MIB tree 600, and the $QA_{service}$ processes and manages all the objects in the service application process MIB tree 640. In a preferred embodiment, the $QA_{SCP}$ and $QA_{service}$ are running on a system separate from the SCP MIB tree (e.g., the SCP platform). In this way, the SCP is able to operate more efficiently.

In addition, since the service application process MIB tree is separate from the SCP MIB tree, an instance of service application process deployment or service application process update may be performed without stopping and recompiling the SCP MIB tree. Yet, the present novel architecture may still be TMN compliant since the function of service application process management still resides within the SCP MIB tree.

II. Service Application Process Addition Within a TMN

When a new service application process is added in the present inventive architecture, it is only necessary to add an instance of service application process management (e.g., add a serviceMgnt object instance for the new service application process) to the SCP MIB tree. Thereafter, the system will deploy an MIB tree, in accordance with the new service application process, that is independent from the SCP MIB tree. In this way, after the deployment, the new service application process may be made available for use within the telecommunications network.

Figure 8:
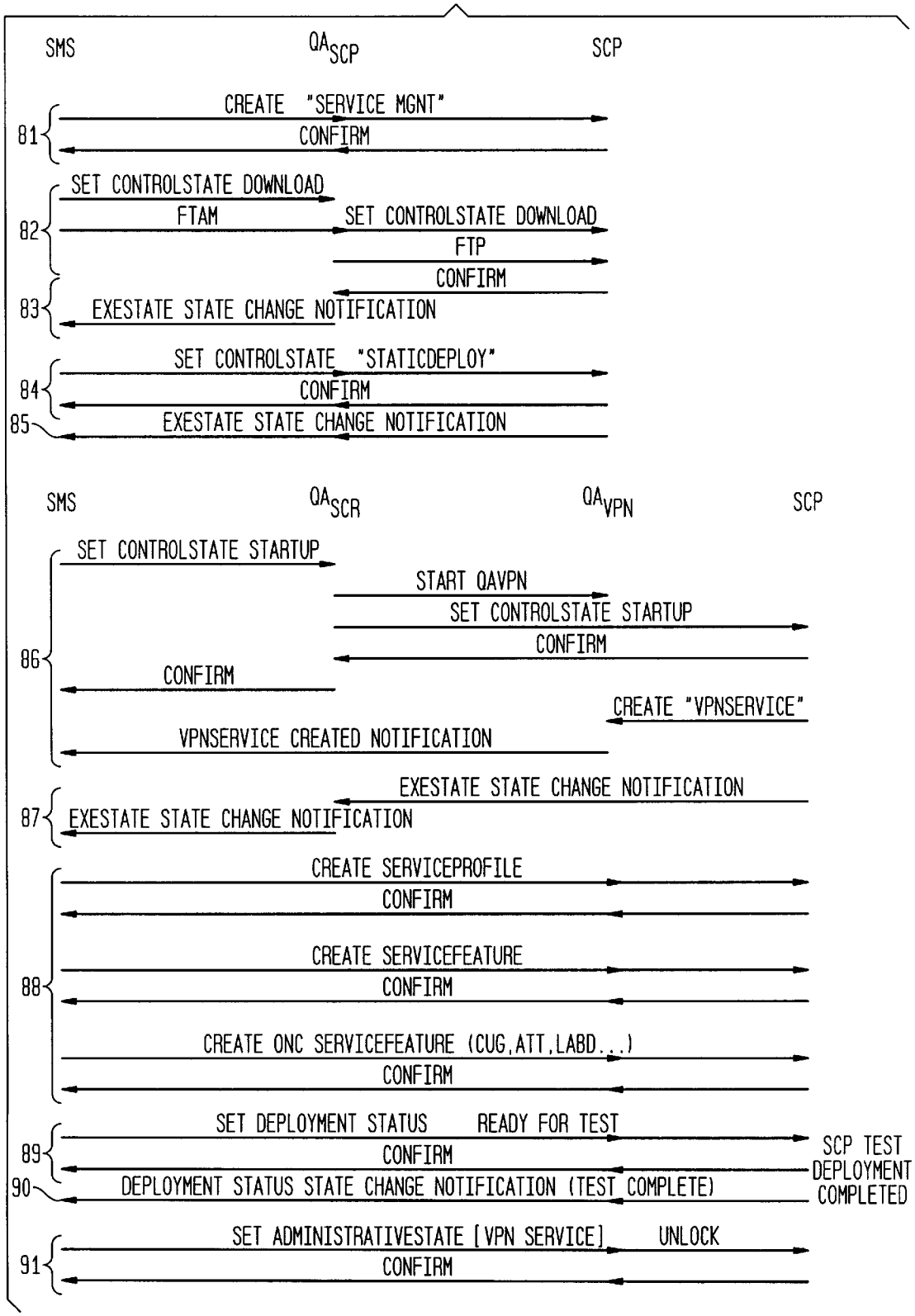
FIG. 8 is an illustrative process chart for deploying a new service application process within an IN in accordance with an embodiment of the present invention.

FIG. 8 shows an illustrative process chart for deploying a new service application process in accordance with an embodiment of the present invention. As shown in step 81, the SMS makes a request to the SCP to create a service management (serviceMGNT) object for a new service application process. The SCP thereafter confirms creation of the serviceMGNT object. In step 82, the SMS will set the attribute controlState to DOWNLOAD to request the $QA_{SCP}$ to download data files and execution files of the new service application process from the SMS. Then, the $QA_{SCP}$ as an agent for the SMS, starts to download the data files and execution files from the SMS. Illustratively, the SMS may transfer the files using a FTAM transfer protocol. Thereafter, the $QA_{SCP}$ will send a message to the SCP, illustratively in a proprietary format, to ask the SCP to download the files (e.g., data and execution file, for the new service application process) received from the SMS. At the end of this step, the SCP has received all the data files and execution files needed for the new service application process. Illustratively, the data files and execution file for the new service application process may be transferred from the $QA_{SCP}$ to the SCP using FTP.

In step 83, after the download is finished, the SCP notifies the $QA_{SCP}$ that the storage was successful. Then, the $QA_{SCP}$ sends the state change notification of the attribute exeSTATE to the SMS. In a case where the download and storage are successful, the state change notification is DOWNLOADOK. In a case where the download or storage was unsuccessful, the state change notification is DOWNLOADFAIL. In that case, the data and execution files are cleared (step not shown) and steps 82 and 83 are repeated.

In step 84, after step 83 is successfully completed (e.g., DOWNLOADOK), the SMS instructs the SCP to construct a working environment (e.g. create a $QA_{service}$) for the new service application process by setting the attribute controlState to STATICDEPLOY. The SCP then confirms that the controlState is set to STATICDEPLOY.

After step 84 is completed successfully, in step 85, the $QA_{SCP}$ will send a STATICDEPLOYOK state change notification of the attribute exeState to the SMS.

In step 86, the SMS will set the attribute control state to STARTUP. In response thereto, the $QA_{SCP}$ will start up the $QA_{service}$ (e.g., a QAvpn for a VPN service application process), then invokes supporting processes on the SCP for the new service application process by sending the STARTUP message of the attribute controlState to the SCP. Confirmation of receipt of the STARTUP command is forwarded from the SCP to the SMS through the $QA_{SCP}$. At this time, the SCP issues a request to the $QA_{service}$ to create the new service application process Service object instance within the service application process MIB tree. After the creation, the $QA_{service}$ issues a Service object creation notification to the SMS.

In step 87, the SMS receives a STARTUPOK state change notification of the attribute exeState from the SCP as forwarded by the $QA_{SCP}$.

In step 88, the SMS creates the necessary object instances for the new service application process for the subscribers. For the case of the VPN service application process, the SMS creates instances of serviceprofile, serviceFeature, etc., in sequence. The SCP will receive all the creations forwarded by the $QA_{vpn}$ and confirm receipt of all the respective processes.

In step 89, after step 88 is completed successfully, the SMS sets the attribute deploymentSTATUS of the new service object(e.g., VPNService) to "READYFORTEST". This message is forwarded by the $QA_{VPN}$ to the SCP. The service object is then within the new service, service application process tree (e.g., new VPN service application process tree). Thereafter, the SCP will start the testing procedure to verify that the newly created service operates correctly.

In step 90, if the testing in step 89 is successfully completed, the SMS will receive a deploymentstatus state change notification with a value of TESTINGCOMPLETE.

In step 91, the SMS sets the attribute admState of the new service application process object (e.g., the VPNService) to UNLOCKED and the new service application process is ready for use.

Once the value of the attribute admState for the service application process object (VPNService) is UNLOCKED, the VPN service application process is accessible by a subscriber using a telephone connected to the signal network as shown in FIG. 5. The VPNService, as modeled by the VPN service application process MIB tree, is utilized through the service application process management object instance within the SCP MIB tree and the $QA_{vpn}$.

III. Service Application Process Update Within a TMN

Due to the present inventive architecture, during a service application process update, there is no need to halt operation of the SCP or the service application process that is being updated. In a case when a service application process is updated, it is only necessary to add a new service application process object instance (serviceMgnt) and a service application process MIB tree for the updated service application process. After the deployment and migration of the updated service application process is completed and the updated service application process is ready for operation, the service application process object instance and the service application process MIB tree of the original service application process is deleted. There is no need to stop operation of the original service application process until the updated service application process is ready. Inventively, in this way, there is virtually no interruption of service performance during the updating process.

Figure 9A:
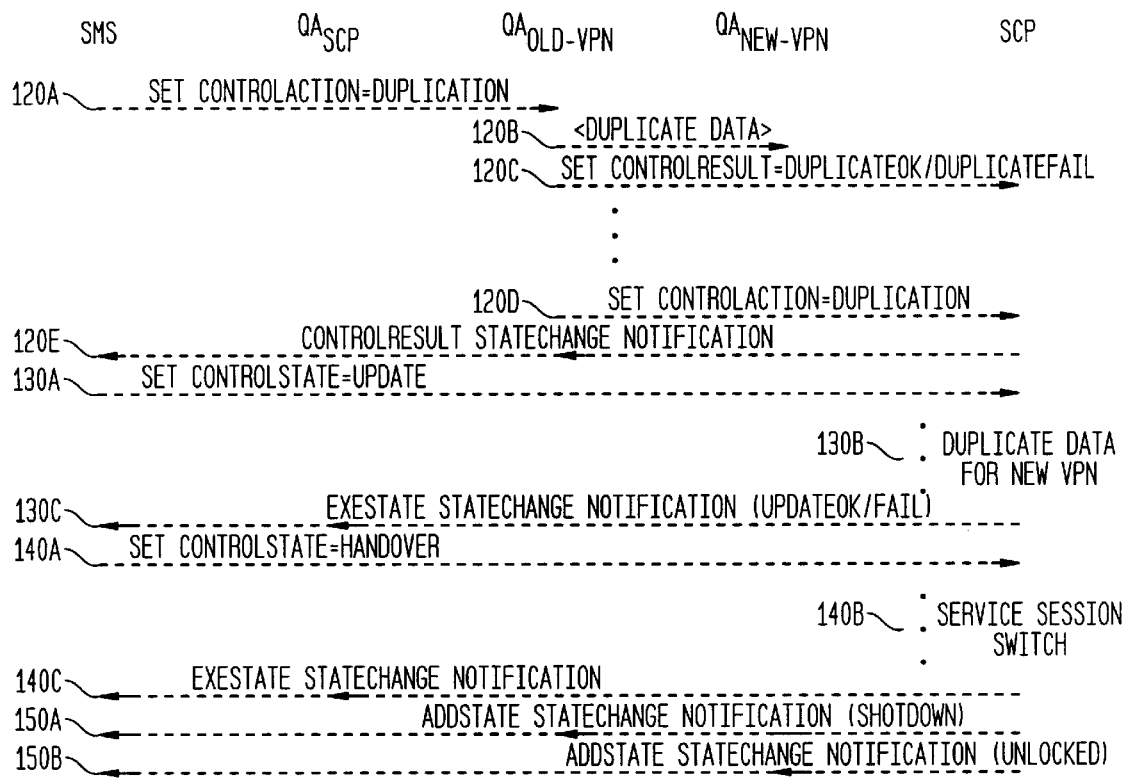
FIGS. 9A and 9B are illustrative process charts for updating an existing service application process within an IN in accordance with an embodiment of the present invention.

FIG. 9A shows an illustrative process chart for updating an existing service application process, such as a VPN, in accordance with the present invention. Before the updating procedure, the existing service application process has to finish all the steps of service application process deployment successfully, such as shown in FIG. 8.

In step 120A, the SMS sets the attribute controlAction of the existing service application process $QA_{old-vpn}$, to DUPLICATE and assigns the values of newServiceGenericNetworkID, and newServiceName.

In step 120B, all the subscription objects and subscriber objects are re-created in $QA_{new-vpn}$ as the same objects in $QA_{old-vpn}$.

In step 120C, after step 120B is finished, the $QA_{old-vpn}$ will set the attribute controlResult of the existing service application process on the SCP to DUPLICATEOK (in a case where the duplication process was successful) or DUPLICATEFAIL (in a case where the duplication process was unsuccessful).

In step 120D, if the duplication process was successfully completed, the SCP is notified by the attribute controlAction being set to DUPLICATE by the $QA_{old-vpn}$.

In step 120E, the attribute controlResult of the existing VPN service application process (either DUPLICATEOK or DUPLICATEFAIL) generates a state change notification from the SCP. This notification is transmitted to the SMS through the $QA_{old-vpn}$.

step 130A, if the duplication process is successful (e.g., DUPLICATEOK), the attribute control state of the new (e.g., updated) VPN serviceMgnt object is set to UPDATE.

In step 130B, the subscription and subscriber data on the SCP (e.g., the existing serviceMgnt object instance) will be duplicated for the updated service application process similar to the process for duplicating $QA_{old-vpn}$ as performed in step 120B.

Thereafter, in step 130C, the SCP sets the exeState of the updated serviceMgnt object instance to UPDATEOK, if the update is successfully completed, or UPDATEFAIL, if the update is unsuccessful. The UPDATEOK/UPDATEFAIL notification of the attribute exeState is forwarded to the SMS through the $QA_{SCP}$.

In step 140A, if the update is successfully completed (e.g., the state change notification is UPDATEOK), the present usage of the existing (e.g., old) VPN service application process is transferred to the updated VPN service application process by the SMS setting the attribute controlState of the updated serviceMgnt object instance to "HANDOVER".

In step 140B, after handover of the present usage of the VPN service application process is completed, the SCP starts context switching wherein new requests for the VPN service application process are switched for processing by the updated VPN service application process, and the new VPN service application process is provided when it is UNLOCKED (see step 150B below).

In step 140C, the exeState state change notification of the updated serviceMgnt object instance is transmitted to the SMS by the SCP. The SMS receives a HANDOVEROK state change notification, if the handover is successfully completed. Otherwise, the SMS receives a HANDOVERFAIL state change notification.

In step 150A, if the handover process is successfully completed (e.g., HANDOVEROK), then the administrative state (the attribute admState) of the old VPN service application process receives an event report of serviceshutdown from the SCP. The $QA_{old-vpn}$ converts this event report to a SHUTDOWN state change notification which is provided to the SMS.

In step 150B, after the SCP has sent out the event report of service shutdown of the old VPN service application process, the SCP starts to service new VPN requests by setting the attribute admState of the new service application process (VPNService) to UNLOCKED.

In accordance with the present invention, shutdown of the old service application process is performed to stop the old service application process while still servicing existing usage.

Due to the sequential steps from step 140B to 150B, the service application process usage may be switched to the new VPN service application process while still accomplishing the object of "non-stopping" access to the service application process.

Figure 9B:
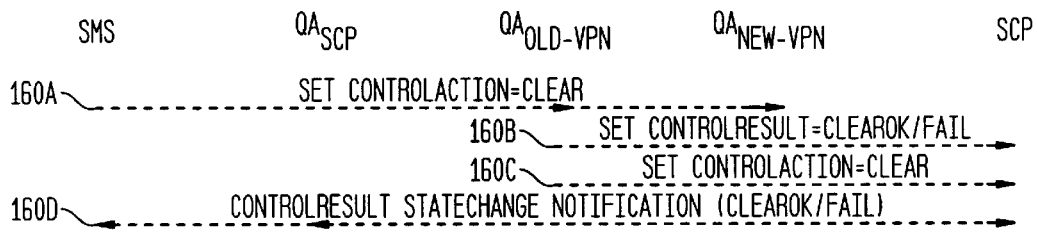

In the event that the attribute controlResult in step 120C equals DUPLICATEFAIL (e.g., the duplication process in step 120B is unsuccessful), then as shown in FIG. 9B, the controlAction is set to CLEAR and the subscription and subscriber objects (e.g., the contents of the MIB tree for the updated service application process) are deleted by the $QA_{new-vpn}$.

In step 160B, the $QA_{new-vpn}$ sets the controlResult of the updated service application process to CLEAROK, if the deletion process is successful, or CLEARFAIL, if the deletion process is unsuccessful. The value of the attribute controlResult is forwarded to the SCP. Thereafter, the SCP will process the subscription and subscriber data duplicated at step 130B, if the attribute controlResult is equal to CLEAROK, then clear it.

In step 160C, the $QA_{new-vpn}$ retransmits the attribute controlAction with a value equal to CLEAR.

In step 160D, the SCP sends an event report of controlResult to the SMS according to the attribute value received from the $QA_{new-vpn}$ at step 160B. The $Q_{new-vpn}$ will convert this event report to a state change notification which is then forwarded to the SMS. After this step, the updating process shown in FIG. 9A can be re-started from step 120B.

It should be noted that although the values of the attributes mentioned above (e.g., "CLEAROK") are illustratively represented by words, they may be mapped to an integer, a character, or any combination thereof.

IV. Conclusion

The present inventive IN architecture provides the function of an SCP that not only offers SCP management, but also is capable of processing deployment of a new service application process or a service application process update without halting the SCP function. Yet, the present inventive architecture is TMN compliant. In addition, in the event of a service application process update, the new service application process may be deployed without interrupting access to the service application process. In this way, the update process need not result in shut down of the SCP or termination of access to the original service application process prior to availability of the updated service application process.

The invention is described above with reference to preferred embodiments as well as illustrative processes. It will be apparent to those skilled in the art that numerous alternative embodiments and processes may be devised without departing from the spirit and scope of the invention which is defined by the appended claims. The preferred embodiments described above were intended to be illustrative only and were not intended to limit the scope of the appended claims.

We claim:

1. A telecommunication intelligent network (IN) system comprising:
    a signal network connected to a telephone;
    a service management system (SMS);
    a service control point (SCP) connected between said signal network and said SMS, wherein said SCP has a management information base (MIB) tree separate from an MIB tree for a service application process; and
    a service application process management object instance contained within said SCP MIB tree; and
    a Q adapter (QAAP),
        wherein said service application process management object instance is configured to link said SCP MIB tree with said service application process MIB tree through said QAAP, and
        wherein said QAAP is configured to process requests for said service application process including access resources of said service application process and transmit results back to said SCP.

2. The IN system of claim 1, wherein said $QA_{AP}$ is further configured to receive event reports from said service application process and transmit said event reports to said SCP.

3. The IN of claim 1, wherein said service application process management object instance is a first service application process management object instance, said IN system further comprising:
    a second service application process management object instance contained within said SCP MIB tree; and
    a second Q adapter ($QA_{SCP}$), wherein said second service application process management object instance is configured to link said SCP MIB tree with said $QA_{SCP}$, and wherein said $QA_{SCP}$ is configured to process requests from said SMS including access resources of said SCP and transmit results back to said SMS.

4. The IN of claim 3, wherein said first and second service application process management object instances are contained within said SCP MIB tree and said IN is configured to be telecommunication management network (TMN) compliant.

5. The IN of claim 3, wherein said SCP is a first computing system and said $QA_{AP}$ and said $QA_{SCP}$ are a second computing system.

6. The IN of claim 3, wherein said SMS is configured to communicate with said $QA_{SCP}$ in a first communication protocol, and said $QA_{SCP}$ is configured to communicate with said SCP in a second communication protocol.

7. The IN of claim 6, wherein said first communication protocol is Q3 compliant and said second communication protocol is Transmission Control Protocol/Internet Protocol (TCP/IP) compliant.

8. The IN of claim 1, wherein said SCP MIB tree contains service application process management object instances and is configured such that addition or updating of a service application process may be performed without interrupting operation of said SCP.

9. A method of deploying a telecommunication intelligent network (IN) comprising the steps of:
    configuring a first management information base (MIB) tree for a service control point (SCP), said first MIB tree having a plurality of SCP platform management objects contained therein;
    configuring a second MIB tree for a service application process, said second MIB tree being separate from said first MIB tree;
    configuring a first one of said plurality of SCP platform management objects to link a Q adapter ($QA_{SCP}$) for said SCP with said first MIB tree, said $QA_{SCP}$ processing requests from a service management system (SMS), accessing resources of said SCP, and transmitting results back to said SMS; and configuring a second one of said plurality of SCP platform management objects to link said second MIB tree with said first MIB tree through a Q adapter ($QA_{AP}$) for said service application process, said $QA_{AP}$ processing requests for said IN service application process including accessing resources of the service application process and transmitting results back to said SCP.

10. The method of claim 9, wherein said service application process is a first service application process, said method further comprising deploying a second service application process by:

adding a new SCP platform management object within said first MIB tree and a Q adapter ($QA_{new}$) for said second service application process;

downloading from said SMS to said SCP through said $QA_{new}$, data and execution files for said second service application process; and compiling said data and execution files at said SCP, to define a third MIB tree, said third MIB tree representing said second service application process.

11. The method of claim 10, further comprising:

determining whether said data and execution files where successfully downloaded;

performing said compiling if said determination is that said download was successful; and clearing said data and execution files downloaded to said SCP, and re-performing said downloading and determining steps if said determination is that said download was unsuccessful.

12. The method of claim 9, further comprising selecting said service application process to be a virtual private network (VPN).

13. The method of claim 9, further comprising updating said service application process, said updating comprising:

configuring a new SCP platform management object within said first MIB tree to link a third MIB tree with said first MIB tree through a Q adapter ($QA_{UAP}$) for said updated service application process; and deleting said second one of said plurality of SCP platform management objects, said $QA_{AP}$, and said second MIB tree.

14. The method of claim 13, wherein said step of configuring said new SCP platform management object further comprises:

copying, from said $QA_{AP}$ to said $QA_{UAP}$, subscription and subscriber data for said service application process; and downloading, from said SMS to said $QA_{UAP}$, updates to said data files and execution files for said updated service application process.

15. The method of claim 14, further comprising:

determining whether said subscription and subscriber data were successfully copied and updated, and serving with the updated subscription and subscriber data by the updated service application process if the determination is that said subscription and subscriber data were successfully copied and updated; and clearing the updated subscription and subscriber data and re-performing said copying, downloading, and determining steps if the determination is that said subscription and subscriber data were not successfully copied and updated.

* * * * *